United States Patent
Sandler et al.

(10) Patent No.: US 9,087,201 B2
(45) Date of Patent: Jul. 21, 2015

(54) SYSTEM AND METHODS FOR HOST ENABLED MANAGEMENT IN A STORAGE SYSTEM

(71) Applicant: Infinidat Ltd., Hertzelia (IL)

(72) Inventors: Kariel Sandler, Bat Hefer (IL); Guy Rozendorn, Tel Aviv (IL); Jacob Broido, Tel Aviv (IL)

(73) Assignee: INFINIDAT LTD., Hertzelia (IL)

( * ) Notice: Subject to any disclaimer, the term of this patent is extended or adjusted under 35 U.S.C. 154(b) by 147 days.

(21) Appl. No.: 13/733,971

(22) Filed: Jan. 4, 2013

(65) Prior Publication Data

US 2013/0179993 A1 Jul. 11, 2013

Related U.S. Application Data

(60) Provisional application No. 61/583,374, filed on Jan. 5, 2012.

(51) Int. Cl.
  *G06F 21/00* (2013.01)
  *G06F 21/60* (2013.01)
  *G06F 21/33* (2013.01)

(52) U.S. Cl.
  CPC .............. *G06F 21/60* (2013.01); *G06F 21/335* (2013.01)

(58) Field of Classification Search
  CPC ........ G06F 21/60; G06F 21/604; G06F 21/62
  USPC .......................... 726/26, 27, 29; 713/189, 190
  See application file for complete search history.

(56) References Cited

U.S. PATENT DOCUMENTS

| | | |
|---|---|---|
| 5,584,008 A | 12/1996 | Shimada et al. |
| 5,673,382 A | 9/1997 | Cannon et al. |
| 6,954,768 B2 | 10/2005 | Carlson et al. |
| 7,143,235 B1 | 11/2006 | Watanabe et al. |
| 7,275,103 B1 | 9/2007 | Thrasher et al. |
| 7,313,718 B2 | 12/2007 | Kelman |
| 7,403,960 B2 | 7/2008 | Kodama |
| 7,584,340 B1 | 9/2009 | Colgrove |
| 7,769,722 B1 | 8/2010 | Bergant et al. |
| 7,783,847 B2 | 8/2010 | Moore et al. |

(Continued)

FOREIGN PATENT DOCUMENTS

WO  2010085228 A1  7/2010

OTHER PUBLICATIONS

Symantec, "Veritas ComrnandCentral(tm)—Supporting the Virtual Enterprise," White Paper: Storage Management, Apr. 2009.

(Continued)

*Primary Examiner* — Edward Zee
(74) *Attorney, Agent, or Firm* — Reches Patents

(57) ABSTRACT

A storage system that includes a management communication interface coupled to a storage management layer and further includes a data communication interface. Upon receiving a request for accessing the storage management layer, from the host, via the data communication interface, the management layer sends to the host, access information necessary for allowing access of the host to the storage management layer via the management communication interface; and upon receiving a management command, from the host via the management communication interface, the host is provided with access to the storage management layer, in cases where the management command conforms to the access information.

23 Claims, 5 Drawing Sheets

(56) References Cited

U.S. PATENT DOCUMENTS

| | | | |
|---|---|---|---|
| 7,836,266 B2 | 11/2010 | Zohar et al. | |
| 7,899,933 B1 | 3/2011 | Black | |
| 7,933,936 B2 | 4/2011 | Aggarwal et al. | |
| 7,937,551 B2 | 5/2011 | Schott | |
| 8,001,295 B2 | 8/2011 | Strutt | |
| 8,001,345 B2 | 8/2011 | Wayda et al. | |
| 8,069,191 B2 | 11/2011 | Revah et al. | |
| 8,086,585 B1* | 12/2011 | Brashers et al. | 707/705 |
| 8,185,663 B2 | 5/2012 | Cochran et al. | |
| 8,219,777 B2 | 7/2012 | Jacobson et al. | |
| 8,284,198 B1 | 10/2012 | Hackworth et al. | |
| 8,533,409 B2 | 9/2013 | Schnapp et al. | |
| 8,539,172 B1 | 9/2013 | Winokur | |
| 2002/0161880 A1* | 10/2002 | Kishimoto et al. | 709/223 |
| 2007/0043705 A1 | 2/2007 | Kaushik et al. | |
| 2007/0055834 A1* | 3/2007 | Malkin | 711/162 |
| 2009/0019251 A1 | 1/2009 | Helman et al. | |
| 2011/0078398 A1 | 3/2011 | Jess | |
| 2011/0082997 A1 | 4/2011 | Yochai et al. | |
| 2012/0259961 A1 | 10/2012 | Winokur | |

OTHER PUBLICATIONS

U.S. Appl. No. 13/004,947, "Storage System and Methods of Operating Thereof," filed Jan. 12, 2011.

U.S. Appl. No. 12/957,613, in the name of Alex Winokur, filed Dec. 1, 2010.

U.S. Appl. No. 13/008,373, in the name of Alex Winokur, filed Jan. 18, 2011.

EMC Corporation, "Information Storage and Management—Storing, Managing, and Protecting Digital Information," Chapter 14—Remote Replication, Edited by G. Somasundaram et al., Wiley Publishinh, Inc, 2009.

* cited by examiner

SYSTEM AND METHODS FOR HOST ENABLED MANAGEMENT IN A STORAGE SYSTEM

CROSS-REFERENCES TO RELATED APPLICATIONS

The present application claims benefit from U.S. Provisional Patent Application No. 61/583,374 filed on Jan. 5, 2012 and incorporated hereby by reference in its entirety.

TECHNICAL FIELD

The presently disclosed subject matter relates to administrative management operations in a storage system and, more particularly, to administrative management operations that are automatically handled by a host connected to the storage system.

BACKGROUND

Typical mass storage systems include a management layer that is separate from the data layer. The management layer is responsible for monitoring, storage provisioning, management of data replication, statistical information and other related tasks, to be used by a system administrator of the storage system. By way of non-limiting example, management tasks include volume management tasks, such as: creating, renaming, resizing and deleting volume, snapshots management tasks, such as creating, restoring and deleting snapshots and many other operations that are not related to the ongoing data access activities (e.g. I/O).

The management layer is typically accessed only by an administrator using a Command Language Interface (CLI) or a web interface. Access to the management layer is typically password protected and uses an encrypted channel (e.g. by using SSL protocol) for communication. Without such protection, anyone who knows the web port address of the management layer may be able to produce commands with devastating effect on the storage system.

A functional diagram of a typical storage system known in the art is demonstrated in FIG. 1 that illustrates a storage system 100 with two communication interfaces: a data communication interface and a management communication interface. The data communication interface is typically implemented by a SCSI (Small Computer System Interface) port 121 coupled to an equivalent port in a host 150 over a data communication path 131. Host 150 communicates with storage system 100 via data communication path 131 for sending data access commands, such as: read data, write data, and the like, and for receiving responses to the data access commands. The management communication interface is typically a web port 122 coupled to an equivalent port of an administrator computer 160, over a management communication path 132. An administrator 165 (a human), using administrator computer 160, can communicate with storage system 100 via management communication path 132 for sending administrative commands that involve allocating and changing storage resources, such as, create volume, resize volume, delete volume, etc. and for receiving responses to the administrative commands. Administrative commands are handled by a management layer 140 while data access commands are handled by a separate entity in the storage system, such as data control layer 160.

In the illustrated storage system, when host 150 needs to create a new volume for example, the operator 155 of host 150 needs to contact the storage administrator 165 of the storage system. The storage administrator creates the new volume using the management layer in the storage system and informs the host operator about privileges, permissions, etc. Requiring human intervention for storage resource management is not suited for large-scale operations, as it is slow, suffers from low accessibility and is error prone.

The problems of minimizing the involvement of an administrator in storage management have been recognized in the Prior Art and various systems have been developed to provide a solution as, for example:

U.S. patent application Ser. No. 13/008,373 filed Jan. 18, 2011 and assigned to the assignee of the present application discloses a method for managing resources in storage pools of external virtual memory. The method includes assigning minimal quotas to respective storage pool portions of a pool, according to resources importance ranks Next, creating resources in corresponding pool portions according to importance rank, and in case that the space in the pool is not sufficient to accommodate the new resource, freeing space including deleting resources in pool portions that exceeded their minimal quotas according to criteria such as importance ranks, until sufficient space is freed for accommodating the new snapshot.

U.S. patent application Ser. No. 12/957,613 filed Dec. 1, 2010 and assigned to the assignee of the present application discloses a method for managing resources in a storage pool of external virtual memory, that includes a host manager being associated with a storage pool by a storage manager. The host manager manages the resources, the managing including creating resources in the storage pool and/or deleting resources in the storage pool. The host manager further accesses the resource in the pool, such accessing including reading data to or writing data to the resource.

U.S. patent application Ser. No. 12/941,246 filed Nov. 8, 2010 and assigned to the assignee of the present application discloses a method for accessing data in an external virtual memory. A host receives from a storage manager a created handle for autonomous access of a volume. The volume forms part of accessible volumes in the virtual memory. The host autonomously provisions the handle to a selected volume from among the accessible volumes, and the host accesses the selected volume through the handle.

SUMMARY

In accordance with certain aspects of the presently disclosed subject matter, there is provided a method of operating a storage system including a management communication interface coupled to a storage management layer and further including a data communication interface, the method including: responsive to receiving a request for accessing the storage management layer, from a host, via the data communication interface, sending to the host, access information necessary for allowing access of the host to the storage management layer via the management communication interface; and responsive to receiving a management command, from the host, via the management communication interface, providing the host with access to the storage management layer, in cases where the management command conforms to the access information.

Optionally, the access information can include address parameters for addressing the management communication interface.

The access information can include authentication information for verifying access of the host to the storage management layer.

In accordance with further aspects of the presently disclosed subject matter, the access information is indicative of a management functionality that is accessible to the host using the access information.

In accordance with further aspects of the presently disclosed subject matter, the method includes generating the access information indicative of a management functionality, in accordance with a classification of the host.

In accordance with further aspects of the presently disclosed subject matter, the method includes generating the access information in accordance with a requested management functionality, included in the request.

In accordance with further aspects of the presently disclosed subject matter, the access information is associated with at least one usage restriction selected from: a time limitation for using the access information and a maximum number of allowed usages of the access information.

In accordance with further aspects of the presently disclosed subject matter, the method further includes denying the access to the storage management layer, in cases where a usage restriction associated with the access information is violated by the management command.

In accordance with further aspects of the presently disclosed subject matter, the method further includes denying access to the storage management layer, in cases where the access information is being reused.

In accordance with further aspects of the presently disclosed subject matter, the method further includes denying access to the storage management layer, in case of expiration of a predefined time limitation, associated with the access information.

In accordance with further aspects of the presently disclosed subject matter, the access information is sent to the host using at least two separate messages.

In accordance with further aspects of the presently disclosed subject matter, the data communication interface can be a small computer system interface (SCSI) port, configured to operate in compatibility with SCSI standard and the request for accessing the storage management layer may include a SCSI vendor specific command.

In accordance with further aspects of the presently disclosed subject matter, the management communication interface is a web port operatively coupled to the management layer.

In accordance with further aspects of the presently disclosed subject matter, the management command is related to controlling a storage resource related to the host.

In accordance with further aspects of the presently disclosed subject matter, the management command is related to control operations selected from a group consisting of: operations with regard to volumes, operations with regard to snapshots, operations with regard to snapshot families, and operations with regard to consistency groups.

In accordance with other aspects of the presently disclosed subject matter, there is provided a storage system including: a data communication interface for receiving data access requests addressed to data stored in the storage system; a management communication interface for receiving management commands; a management layer, operatively coupled to the data communication interface and to the management communication interface, and configured to: receive, via the data communication interface, a request, from a host, for accessing the management layer; send to the host via the data communication interface, access information necessitated for allowing access of the host to the management layer, via the management communication interface; receive from the host, via the management communication interface, a management command; and provide the host with access to the storage management layer, in cases where the management command conforms to the access information.

In accordance with other aspects of the presently disclosed subject matter, there is provided a non-transitory computer readable storage medium that stores instructions to be executed by a storage system for: responsive to receiving a request for accessing the storage management layer, from a host, via the data communication interface, sending to the host, access information necessary for allowing access of the host to the storage management layer via the management communication interface; responsive to receiving a management command, from the host via the management communication interface, providing the host with access to the storage management layer, in cases where the management command conforms to the access information.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the disclosed subject matter. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "providing", "sending", "creating", "updating", "writing", "accessing", "associating", "identifying", "obtaining", "generating", "authenticating", "verifying" or the like, refer to the action and/or processes of a computer that manipulate and/or transform data into other data, said data represented as physical quantities, e.g. such as electronic quantities, and/or said data representing the physical objects. The term "computer" as used herein should be expansively construed to cover any kind of electronic device with data processing capabilities.

The operations in accordance with the teachings herein can be performed by a computer specially constructed for the desired purposes or by a general-purpose computer specially configured for the desired purpose by a computer program stored in a computer readable storage medium.

Figure 2:
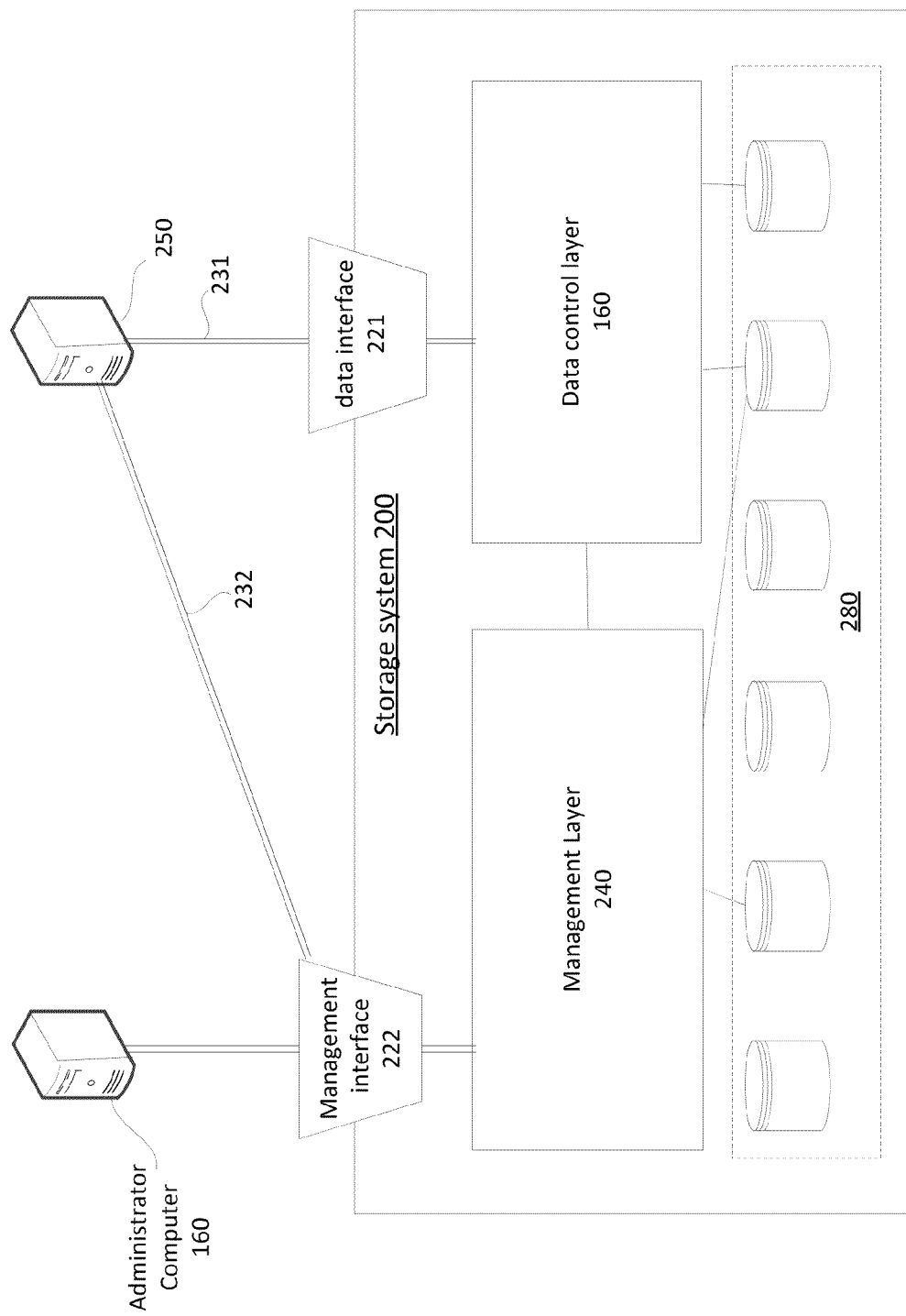
FIG. 2 is a functional block diagram schematically illustrating a storage system and a host, according to embodiments of the presently disclosed subject matter.

FIG. 2 illustrates a storage system 200 and a host 250, in accordance with embodiments of the presently disclosed subject matter. Storage system 200 is configured to enable host 250 to perform management commands, which are traditionally performed by the system administrator. These host enabled management commands are communicated between host 250 and storage system 200, via a communication line, that is separate from a communication line of data transferring.

Figure 1:
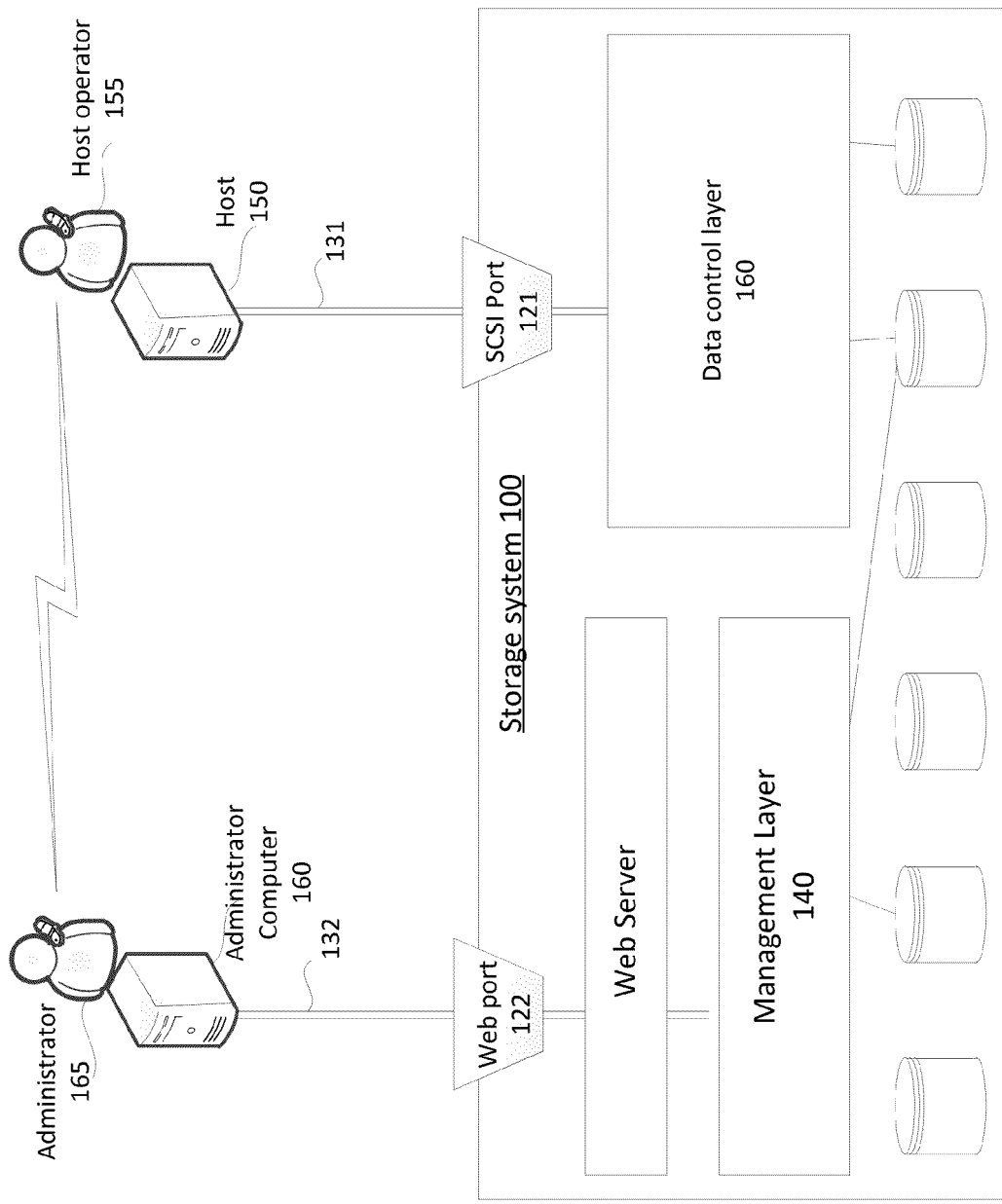
FIG. 1 is a functional block diagram schematically illustrating a known in the art storage system, a host and administrator.

Storage system 200 includes two communication interfaces: a data communication interface 221 and a management communication interface 222, wherein unlike system 100 of FIG. 1, both communication interfaces are accessible to host 250.

Data communication interface 221 can implement block-based access standards, such as Small Computer Systems Interface (SCSI) protocol encapsulated over FibreChannel or over TCP/IP/Ethernet (iSCSI). Alternatively or additionally, data communication interface 221 can implement a file-based protocol (NAS). Data communication interface 221 includes all the hardware and software required for enabling data communication, including the proper protocols and standards mentioned above, as well as proper cabling and at least one connector (e.g.: a parallel SCSI, Serial Attached SCSI (SAS), optical fibre connector, Ethernet connector and the like).

Data communication interface 221 is coupled to an equivalent interface in host 250, over a data communication path 231, which may be a local area network (LAN), a wide area network (WAN), a directly attached bus, or any other network topology. Data communication path 231 includes all the wiring required to implement a proper communication protocol for carrying the commands included in the block-based access protocol or the file-based access protocol.

Host 250 communicates with storage system 200 via data communication path 231 for sending data access commands, such as: read data/metadata, write data, or queries related to data or to storage resources, and for receiving responses to these commands. SCSI commands may be used, as a non-limiting example, for implementing the data access commands communicated over data communication path 231.

Management communication interface 222 can implement any management protocol. Typically a web protocol can be used as management protocol, such as but not limited to Json (JavaScript Object Notation) or SMI-S (Storage Management Initiative-Specification). The management protocol can be carried over an Internet protocol, e.g., HTTP, preferably with secured capabilities of SSL/TLS or directly over TCP/IP. Alternatively, management communication interface 222 can implement CLI commands or any other proprietary management protocol. Management communication interface 222 includes all the hardware and software required for enabling management communication, including the proper protocols as well as proper cabling and at least one connector, e.g. an Ethernet connector, a USB connector and the like. Optionally, both data communication interface 221 and management communication interface 222 can utilize the same connector, e.g. an Ethernet connector, wherein each communication interface implements a different higher layer protocol, e.g. SCSI over iSCSI with a certain TCP port number may be used by interface 221, while interface 222 is using a management protocol over HTTP/TCP/IP with a different TCP port number.

Management communication interface 222 is coupled to an equivalent interface in host 250 (in addition to the traditional management connection to administrator computer 160), over a management communication path 232. Host 250, can communicate with storage system 200 via management communication path 232 for sending management commands, for example, commands that involve allocating and changing storage resources, such as create volume or snapshot, resize volume, delete volume or snapshot, etc., and for receiving responses to the management commands.

Storage system 200 is illustrated as including two layers: a management layer 240 and data control layer 160. Data control layer 160 is coupled to data communication interface 221 and to a storage array 280 and includes all the modules (not shown) required to serve commands received via data communication interface 221 and to read and write data stored in storage array 280. Management layer 240 is coupled to management communication interface 222 and includes all the modules (not shown) required to serve commands received via management communication interface 222. Management layer 240 can be further coupled to data communication interface 22, either directly or indirectly via data control layer 160, for receiving host requests for accessing management layer 240.

Access of hosts via management communication path 232 is restricted and should be controlled, so as to limit access to trusted hosts. According to embodiments of the presently disclosed subject matter, management layer 240 is configured to manage hosts' access to the management layer, which can include: receiving requests to access the management layer, deny the access requests or provide authentication information required to access the management layer, to authenticate hosts that access the management layer using the provided information and to limit the validity of the authentication parameters in terms of time and number of accesses. Management control layer 240 can manage an access table that includes accounts for the authorized hosts and their associated authentication information.

Host 250 is configured to retrieve management access information including all the parameters necessary for allowing access of the host to management layer 240, via management communication path 232. The management access information can include authentication parameters, such as a password and can also include address parameters related to management communication interface 222, such as IP-address and port number (e.g. TCP port) of the management interface. Optionally, management access information can include usage restrictions for the authentication parameters, for example: the number of accesses permitted using these authentication parameters or time expiration of the authentication parameters.

Host 250 retrieves the management access information from the storage system, via data communication path 231. According to one embodiment, data communication path 231 carries SCSI protocol and the host can submit Inquiry SCSI command, with a vendor specific page (e.g. page code D0h). Once the host obtains the management access information, it can then send a management command to the management layer through management communication path 232, which arrives at management interface 222 coupled to the management layer in the storage system.

Storage system 200 can be configured to enable communication between more than one host and management interface 222.

Those versed in the art will readily appreciate that the embodiments of the invention are not bound by the specific architecture described with reference to FIG. 2; equivalent and/or modified functionality can be consolidated or divided in another manner. In different embodiments of the presently disclosed subject matter management layer 240 and data control layer 160 and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wire-line, Wireless, cable, Internet, Intranet, power, satellite or other networks and/or using any appropriate communication standard, system and/or protocol and variants or evolution thereof (as, by way of unlimited example, TCP/IP, Ethernet, iSCSI, Fiber Channel, etc.).

Figure 3:
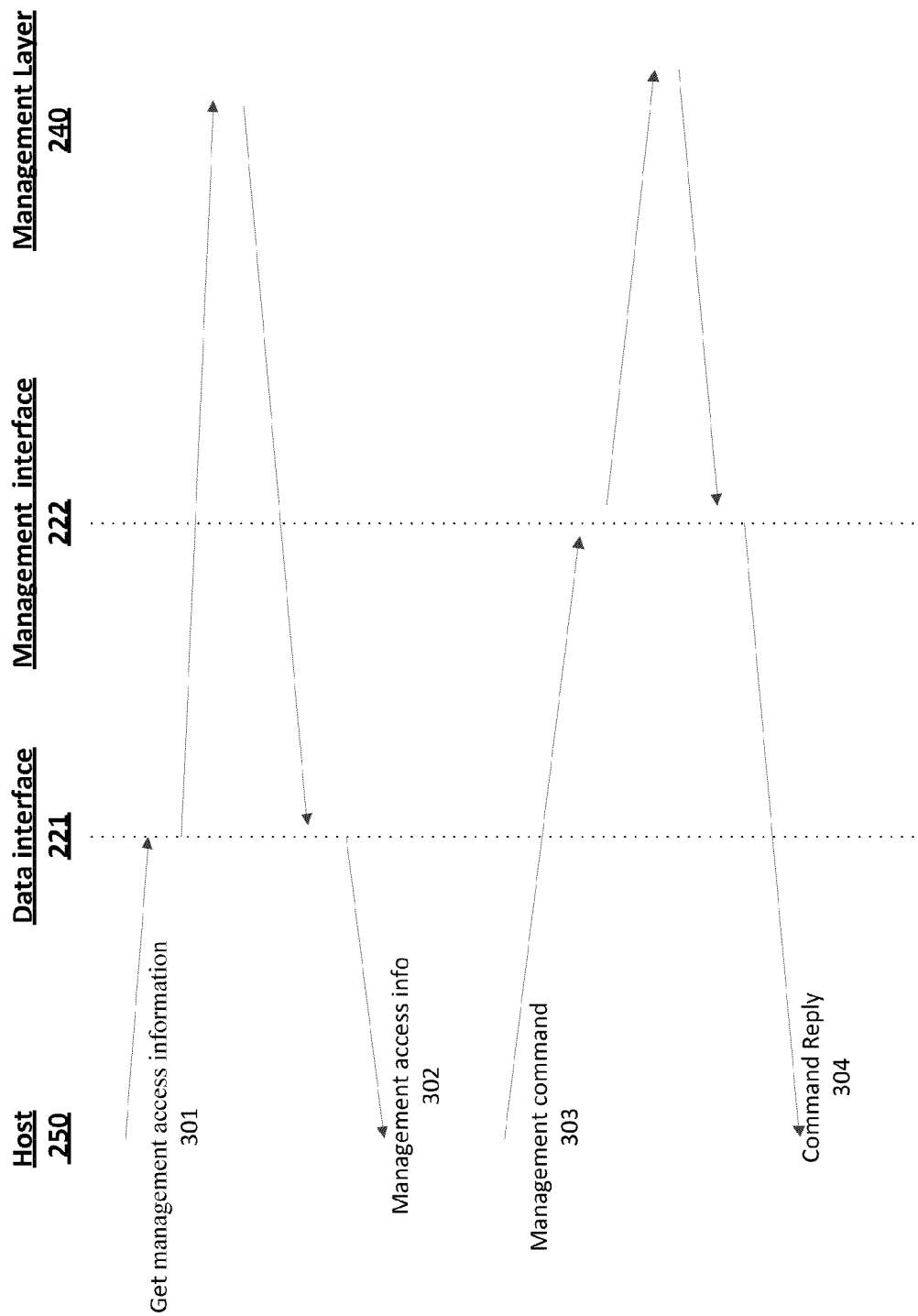
FIG. 3 is a sequence diagram, schematically illustrating a communication flow, between a host and various components of a storage system, according to embodiments of the presently disclosed subject matter.

FIG. 3 illustrates a sequence diagram of communication flow between the host and the storage system in accordance with certain embodiments of the presently disclosed subject matter.

Host 250 sends, via data communication path 231, a request 301 to retrieve management access information. Request 301 may include a requested management functionality that the host intends to use. By way of non-limiting examples, the requested management functionality can be: volume creation, volume deletion, snapshot creation, snapshot restoration, etc. Request 301 can be implemented by sending a SCSI command, for example, SCSI vendor specific Inquiry command that is sent via the SCSI channel. The SCSI vendor specific Inquiry command may include, for example, the following fields: the OPERATION CODE is set to 12 h; EVPD (Enable Vital Product Data bit) is set to 1 to indicate that the information to be returned is not the standard INQUIRY data but instead, the PAGE CODE field specifies which page of vital product data information the device server shall return; the PAGE CODE may be set, for example, to Device Identification (083h) or a code indicating a vendor specific page (C0h-FFh).

Request 301 is received by the data interface, (e.g. a SCSI driver or any other port driver included in the data interface) that in turn forwards request 301 to 10 management layer 240. The forwarded request includes equivalent content to the received request and may have the same format or alternatively, an internal format that is used to internally communicate among components in the system.

The management layer generates the management access information that includes at least authentication parameters, e.g. a password. The generation may be based on the host identity, the requested management functionality etc. The management layer creates a user account with default privileges for the host. The authentication parameters are stored in a data structure which will be used (in a future communication) to validate the host that requested the management functionality. The management access information may further include address parameters, such as an IP-address and port number of the management interface.

The management layer sends the management access information 302 to the host via the data interface, which may transform the format of the request into a format that complies with the respective data protocol, e.g. a SCSI response.

The host obtains access information from the reply and builds a management command 303 that uses the authentication parameters and in addition, the addressing parameters may be used as part of the TCP/IP headers of the management command.

The host sends management command 303, via the management communication path, to the management layer, using the address parameters, e.g. IP address of the management port and the port number. The management communication path may be a secured channel and thus the host may communicate with the management interface using a cryptographic protocol, such as SSL, so as to provide communication security.

Management command 303 is received at management interface 222 that forwards the command to the management layer, which in turn authenticates the host and the request using the authentication parameters embedded in the management command.

If authentication is passed, the management layer sends a command reply 304 to the management command through the management interface 222 and the host receives the command reply, via the management communication path.

Optionally, the authentication parameters can be generated externally to the management layer in response to a command generated by the management layer. By way of non-limiting example, the password can be generated by a password generator operable to generate the password responsive to a command received from the management layer, to send the generated password to the management layer and to verify the host permissions once they are received in the management layer.

Figure 4:
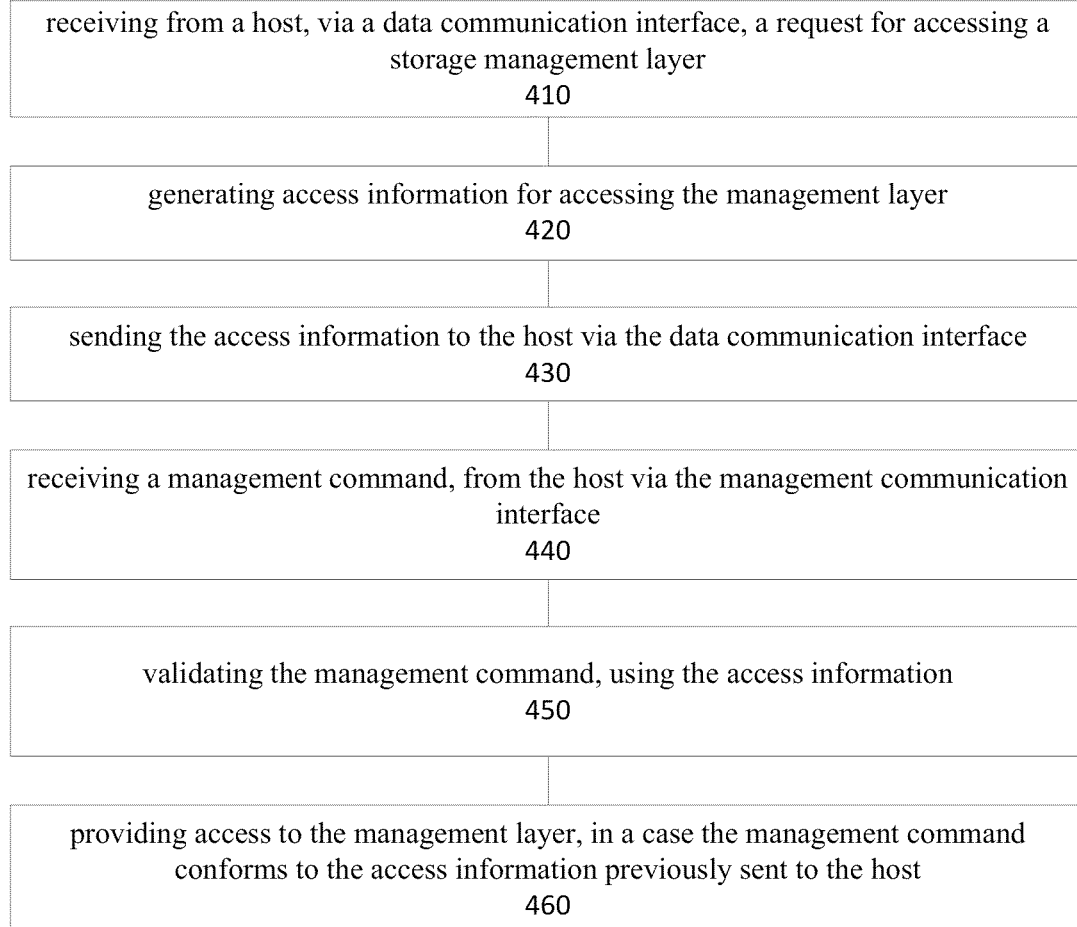
FIG. 4 is a flowchart schematically illustrating a method for accessing a management layer of a storage system, according to embodiments of the presently disclosed subject matter.

FIG. 4 illustrates a method 400 of providing management services to a host. Method 400 is executed by a storage device, such as storage system 200.

Method 400 begins with a step 410 of receiving from a host, via a data communication interface, a request for accessing the storage management layer. The data communication interface may be a SCSI port or any other port configured to communicate I/O and data access related commands. The request may include the identity of the host and the management functionality or service, requested to be accessed.

Step 410 is followed by step 420 of generating access information necessary for allowing access of the host to the management layer via the management communication interface. The access information may include address parameters for addressing the management communication interface (e.g. IP address and port number of the management interface) and authentication information for verifying access of the host to the management layer (e.g. a password, an encryption key, a token, etc.) and for allowing access if the verification is successful.

The authentication information, or the entire access information, may be indicative of the management functionality that can be accessible to the host when using this authentication information. According to one embodiment of access information that is indicative of the management functionality, certain passwords may be used for accessing certain categories of management functionalities (e.g. deletion of snapshots or deletion of any storage resource) but these certain passwords cannot be used for accessing other management functionalities (e.g. creating storage resources). According to another embodiment, different IP addresses can be used to differentiate accesses to different functionalities. The generation of access information that is indicative of the management functionality may be done in accordance with the identity of the host and/or with a classification of the host, as predefined in the management layer. According to an embodiment, the hosts may be classified into several levels of privileges that can be provided to these hosts (e.g. high level of privileges for highly trusted hosts, medium level for average trusted hosts, low level, manager level, etc.). The generation of access information that is indicative of the management functionality may be further dependent on the required management functionality as indicated in the request to access the management layer, i.e. a host that requested access to volume deletion may not gain access to resource consuming services, such as volume creation or resizing. For example, different passwords may be assigned to different management functionalities and/or different passwords may be assigned to different hosts or different classification of the hosts.

The access information may be further associated with usage restrictions, such as a time limitation for using the access information, or maximum number of allowed usages. For example, the authentication parameters may be valid only for one time access to the management layer, or the authentication parameters may have expiration time.

Step 420 is followed by step 430 of sending the access information to the host, preferably but not necessarily, via the data communication interface.

Step 410 and 430 may include sending more than one message for requesting the access information and more than one message for sending all the access information. According to one embodiment, the host may request the authentication parameters first and after receiving the authentication parameters, the host may send a second request for receiving the address parameters.

Step 430 is followed by step 440 of receiving a management command, from the host via the management communication interface. The management command may be related to controlling a storage resource related to the host. The storage resource may be a volume, a snapshot, a snapshot/volume family, a consistency group, etc. The controlling may include: creating a volume/snapshot, changing a volume/snapshot, deleting a volume/snapshot, etc.

The management command must conform to the access information provided to the host in step 430. The command conforms to the access information, for example, by including the authentication information (e.g. password) within the command, by being encrypted by a key included in the authentication information or by including a signature that was produced using the key. Optionally, if the access information is indicative of a management functionality, then the management functionality implied by the command should match the management functionality indicated in the access information. Optionally, if usage restrictions were defined, the command should not violate the usage restrictions associated with the access information (i.e. the authentication parameters have not expired or are over-used).

Step 440 is followed by step 450 of validating the management command, using the access information (and particularly, authentication parameters). The command is considered valid if it conforms to the access parameters, as described above. The validation may further include checking if the command meets the usage restriction of the access information or if the command violates the usage restrictions, e.g. if the time limitation of the access information has expired, or if the number of times these parameters have been used in a management command is exhausted. If the command does not conform to the access parameters and/or if it violates the usage restrictions, then step 450 includes denying access. If the access information is associated with a restriction of one usage only, the account of the host that sent the management command is deleted, and if the host reuses this information in another management command, the other command is denied.

Step 450 is followed by step 460 of providing the host with access to the management layer, in cases where the management command conforms to the access information previously sent to the host, in step 430. Providing access to the management layer can include: executing the management command (e.g. creating a new volume), gaining access to services related to resource storage management (e.g. creation, deletion and properties changing of volumes and snapshots, snapshot restoration, etc.), providing management information requested in the command, entering administrator screens of the system's GUI, etc.

Figure 5:
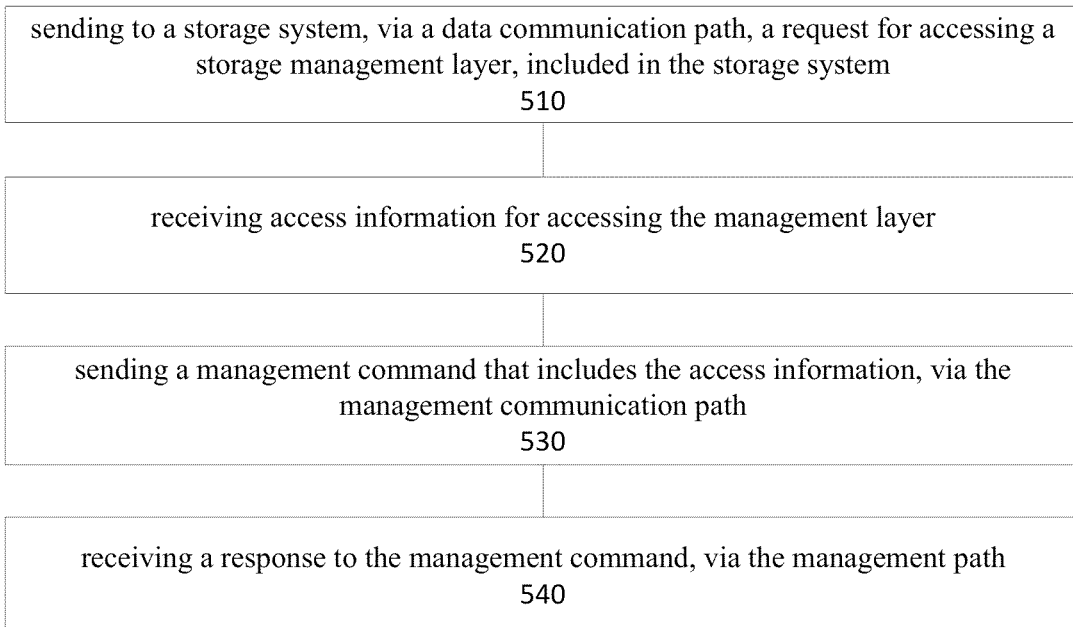
FIG. 5 is a flowchart schematically illustrating a method for accessing a management layer of a storage system, according to embodiments of the presently disclosed subject matter.

FIG. 5 illustrates a method 500 of using management services of a storage system. Method 500 is executed by a host that communicates with e.g. storage system 200.

Method 500 begins with step 510 of sending to a storage system, via a data communication path, a request for accessing a storage management layer, included in the storage system.

Step 510 is followed by step 520 of receiving access information for accessing the management layer. The access information may include address parameters for addressing the management layer via a management communication interface and authentication parameters for allowing access of the host to the management layer.

Step 520 is followed by step 530 of sending a management command indicative of the access information, via the management communication path.

Step 530 is followed by step 540 of receiving a response to the management command, via the management path. The response may include denial of serving the management command or acknowledging execution of the management command.

Those versed in the art will readily appreciate that the password management can be implemented in different manners, some of them known in the art. By way of non-limiting example, the password can be a static, hard-coded password. The password may have expiration time and date. Likewise, the password granting policy can be varied, for example depending on a given host, the required management functionality or the required duration to perform the functionality.

Those versed in the art will readily appreciate that, likewise, the host can retrieve the password from the management layer using standards other than SCSI communication standard suitable for communication between the host and the storage system. It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present invention.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A method of providing management services, the method comprising:
   a. in response to receiving by a storage system via a data communication interface of the storage system, a request from a host for accessing a storage resource management service for managing a storage resource related to the host, wherein the storage resource management service is accessible via a management communication interface of the storage system, sending to the host, via said data communication interface, access information for allowing access of the host to the storage system via said management communication interface; wherein the data communication interface is configured to communicate data access commands, that comply with a data protocol, between the host and storage system; wherein the access information is sent as a message having a format that complies with the data protocol; wherein the management communication interface is configured to communicate management commands that comply with a management protocol; and wherein the management protocol differs from the data protocol; and
   b. in response to receiving, by the storage system, from the host via said management communication interface, a management command with regard to the storage resource management service, providing the host access to the storage resource management service via the management communication interface, in cases where the management command conforms to said access information.

2. The method of claim 1, wherein said access information comprises address parameters for enabling communication between the host and the storage system via said management communication interface.

3. The method of claim 1, wherein said access information comprises authentication information for verifying access of the host via the management communication interface.

4. The method of claim 1, wherein said access information is indicative of a management functionality that is available to the host when using the access information.

5. The method of claim 1 comprising generating said access information, wherein the access information is indicative of a management functionality that is available to the host, in accordance with a trust level of the host.

6. The method of claim 1 comprising generating said access information in accordance with a requested management functionality for managing the storage resource, comprised in said request.

7. The method of claim 1, wherein said access information is associated with at least one usage restriction selected from: a time limitation for using said access information and a maximum number of allowed usages of said access information.

8. The method of claim 1 further comprising denying access via said management communication interface, in case a usage restriction associated with said access information is violated by said management command.

9. The method of claim 1 further comprising denying access via said management communication interface, if a number of times said access information has been used exceeds a maximum number of allowed usages of said access information.

10. The method of claim 1 further comprising denying access via said management communication interface, in case of expiration of a predefined time limitation, associated with said access information.

11. The method of claim 1, wherein said access information is sent to the host using at least two separate messages.

12. The method of claim 1 wherein said data communication interface is a small computer system interface (SCSI) port, configured to operate in compatibility with SCSI standards.

13. The method of claim 1 wherein said request comprises a SCSI vendor specific command.

14. The method of claim 1, wherein the storage resource is selected from a group consisting of: one or more volumes, one or more snapshots, and one or more consistency groups.

15. A storage system comprising:
   a data communication interface for receiving data access requests that comply with a data protocol and addressed to data stored in said storage system;
   a management communication interface for receiving management commands that comply with a management protocol;
   wherein the management protocol differs from the data protocol; and
   a management layer, operatively coupled to said data communication interface and to said management communication interface, and configured to:
   receive via said data communication interface a request from a host for accessing a storage resource management service for managing a storage resource related to the host, wherein the storage resource management service is accessible via the management communication interface;
   send to the host via said data communication interface, access information for allowing access of the host to the storage system via said management communication interface; wherein the access information is sent as a message having a format that complies with the data protocol;
   receive via said management communication interface a management command of the management commands with regard to the storage resource management service from the host; and
   provide the host access to the storage resource management service via the management communication interface, in cases where the management command conforms to said access information.

16. The storage system of claim 15, wherein said access information comprises authentication information for verifying access of the host via the management communication interface.

17. The storage system of claim 16, wherein said management layer is configured to generate said authentication information in accordance with an identity of the host.

18. The storage system of claim 16, wherein said management layer is configured to generate said authentication information in accordance with a requested management functionality, comprised in said request.

19. The storage system of claim 15, wherein said management layer is configured to associate said access information with at least one usage restriction selected from: a time limitation for using said access information and a number of maximum allowed usages of said access information.

20. The storage system of claim 15, wherein said management layer is configured to deny access via said management communication interface, in cases where a usage restriction associated with said access information is violated by said management command.

21. The storage system of claim 15 wherein said data communication interface is a small computer system interface (SCSI) port, configured to operate in compatibility with SCSI standards.

22. The storage system of claim 15, wherein said management communication interface is a web port operatively coupled to said management layer.

23. A non-transitory computer readable storage medium that stores instructions that when executed by a storage system, cause the storage system to:
  a. in response to receiving by the storage system via a data communication interface of the storage system, a request from a host for accessing a storage resource management service for managing a storage resource related to the host, wherein the storage resource management service is accessible via a management communication interface of the storage system, send to the host access information for allowing access of the host to the storage system via said management communication interface; wherein the data communication interface is configured to communicate data access commands, that comply with a data protocol, between the host and storage system; wherein the access information is sent as a message having a format that complies with the data protocol; wherein the management communication interface is configured to communicate management commands that comply with a management protocol; and wherein the management protocol differs from the data protocol;
  b. in response to receiving a management command with regard to the storage resource management service from the host via said management communication interface, provide the host access to the storage resource management service via the management communication interface, in cases where the management command conforms to said access information.

* * * * *